May 26, 1970    TOSHIO ITO ET AL    3,514,646
HEAT RESISTING INSULATION WALL
Filed April 22, 1968    4 Sheets-Sheet 1

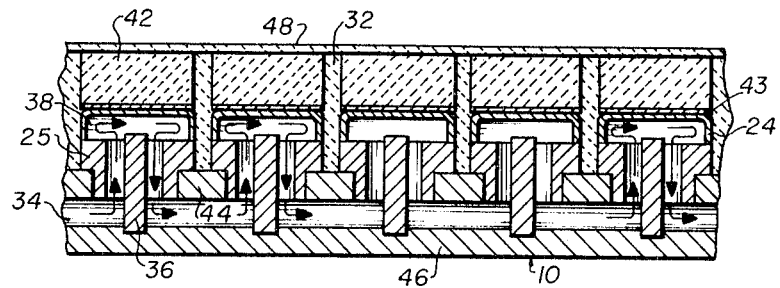

United States Patent Office 3,514,646
Patented May 26, 1970

3,514,646
HEAT RESISTING INSULATION WALL
Toshio Ito, Tetsuya Morikawa, Yutaka Murai, Yukito Kobayashi, and Masato Yanase, Amagasaki, Japan, assignors to Mitsubishi Denki Kabushiki Kaisha, Tokyo, Japan
Filed Apr. 22, 1968, Ser. No. 723,046
Claims priority, application Japan, Apr. 24, 1967, 42/26,118; June 15, 1967, 42/38,432; Aug. 1, 1967, 42/49,425, 42/49,427, 42/49,428
Int. Cl. G21d 7/02; H02k 45/00
U.S. Cl. 310—11                                                5 Claims

ABSTRACT OF THE DISCLOSURE

The disclosed walls each comprise a multiplicity of wall blocklets made of a heat resisting, electrically insulating material disposed at equal intervals in aligned relationship to form a narrow gap between them, which is filled with refractory cement. The exposed surface of the wall is composed of one surface of the blocklets while the opposite surfaces of the blocklets are metallized and brazed to metallic members adapted to be cooled with water.

---

This invention relates in general to heat resisting insulation walls and more particularly to improved heat resisting insulation walls suitable for use with magnetohydrodynamic power generator apparatus.

One of the important problems encountered in designing and constructing magnetohydrodynamic (MHD) power generator apparatus is to provide heat resisting insulation walls exposed to hot working gases, having a high reliability and a long useful lifetime. Since such a working gas contains an element such as potassium highly corrosive and traveling at a high speed while being maintained at an elevated temperature, any material for the wall is required to be highly resistive to heat, corrosion, wear, thermal shock, thermal stress, oxidation, etc. as well as being high in electrical insulation. Because of none of the heat resisting materials presently available sufficiently meet the above cited requirements at elevated temperatures, it has been common practice to produce heating resisting insulation walls from any suitable heat resisting material such as alumina or magnesia and to cool the rear surfaces of the walls thereby to put them at their tolerable temperatures. There is a fear that such walls may be cracked and partly scattered due to the heat cycles of the walls during service.

To avoid these defects, it has been already proposed to divide the wall into a multiplicity of small pieces joined to a cooling plate while a refractory cement fills gaps between the small wall pieces thereby to decrease friction between the wall and a working gas involved as well as preventing the walls from deteriorating in electrical insulation resulting from compounds of potassium and water vapor contained in the working gas penetrating into the wall. However as the refractory cement has a water absorbing property appreciable amounts of the compounds of potassium and water vapor could penetrate into the insulation wall to appreciably deteriorate the electrical insulation of the wall and also to partly scatter the refractory cement filling the gaps between the wall pieces.

Accordingly it is a general object of the invention to provide a new and improved heat resisting insulation wall effectively cooled, prevented from cracking due to its thermal expansion and contraction, low in thermal loss and relatively simple in construction.

It is an object of the invention to provide a new and improved heat resisting insulation wall prevented from penetrating the compounds of potassium and water vapor contained in a hot working gas involved into the wall to deteriorate the electrically insulating property thereof by having a coated surface exposed to the working gas.

It is another object of the invention to provide a new and improved heat resisting insulation wall composed of a multiplicity of wall blocklets having a refractory cement filling gaps between those portions of the wall blocklets exposed to elevated temperature and a synthetic resinous material filling gaps between those portions of the wall blocklets exposed to lower temperatures thereby to improve both the mechanical strength and the electrically insulating property.

It is still another object of the invention to provide improved means for effectively water cooling a heat resisting insulation wall composed of a multiplicity of wall blocklets to improve the cooling effect.

It is a further object of the invention to provide improved means for cooling a heat resisting insulation wall composed of a multiplicity of wall blocklets through their support member of electrically insulating material to improve the electrically insulating property of the wall.

According to the invention there is provided a heat resisting insulation wall composed of at least a heat resisting, electrically insulating block having one surface exposed to a hot gas, characterized by a metallized layer disposed on the opposite surface of the block, a cooling metallic member brazed to the metallized layer, and means for cooling the cooling member with a fluid coolant.

In a preferred embodiment of the invention, a heat resisting, electrically insulating wall may comprise a plurality of blocklets made of a heat resisting, electrically insulating blocklets and disposed in substantially aligned relationship at substantially equal intervals to form narrow gaps therebetween, each of the blocklets having one surface exposed to a hot gas, a refractory layer filling each of the gaps between the blocklets, and means including a fluid coolant to cool the blocklets, characterized in that each of the blocklets has the opposite surface metallized and one cooling metallic element is brazed on the metallized surface of each blocklet and cooled by the cooling means to cool the blocklets.

Preferably the gaps formed between the wall blocklets may be filled with refractory cement equal in properties to the heat resisting electrically insulating material and the exposed surfaces of the wall blocklets and filled cement may be coated with a powdered material equal in properties to both the insulating material and the refractory cement.

Advantageously, each of the gaps between the wall blocklets has its portion at a high temperature filled with a refractory cement and the remaining portion at a lower temperature filled with a synthetic resinous material.

The cooling member may be conveniently cooled directly with a fluid coolant such as water.

The invention will become more readily apparent from the following detailed description taken in conjunction with the accompanying drawings in which.

Figure 11:
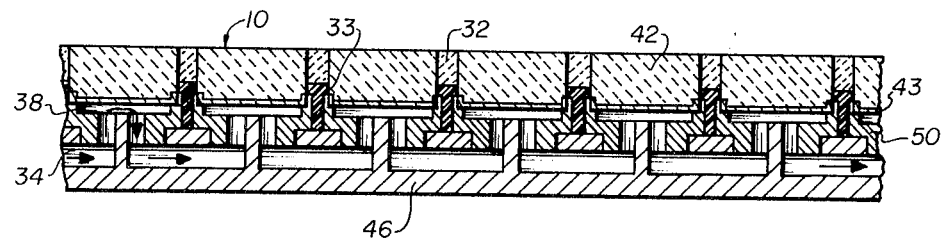
Figure 12:
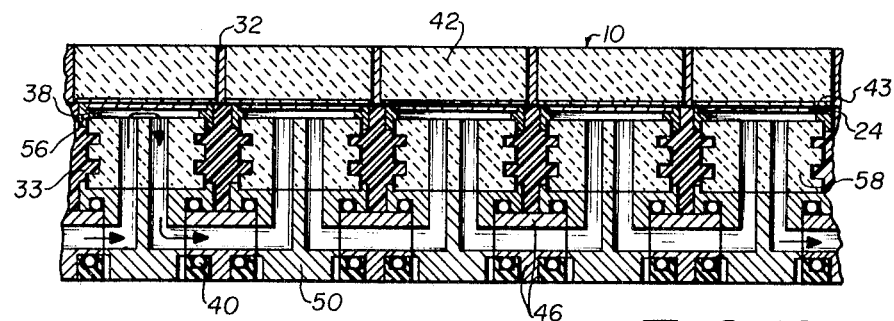
Figure 13:
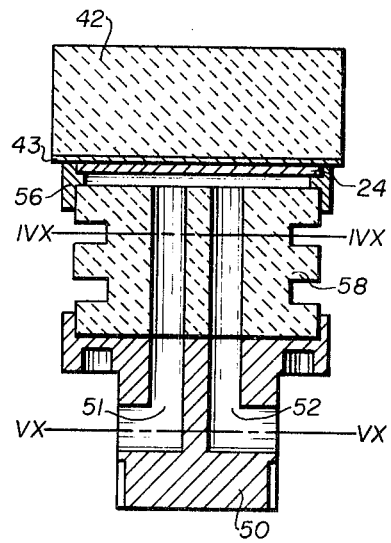
Figure 14:
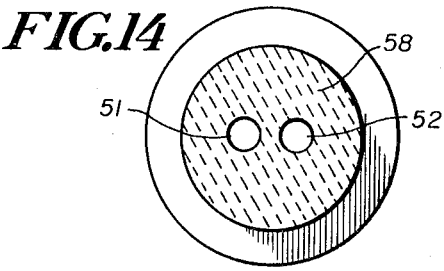
Figure 15:
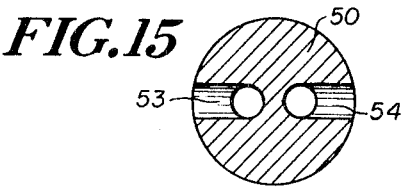

FIGS. 5 to 8 inclusive are fragmental sectional views of various modifications of the invention;

FIG. 9 is a sectional view of one wall blocklet illustrated in FIG. 8;

FIG. 10 is a sectional view taken along the section line X—X of FIG. 9;

FIGS. 11 and 12 are fragmental sectional views of further modifications of the invention;

FIG. 13 is a sectional view of one wall blocklet illustrated in FIG. 12;

FIG. 14 is a sectional view taken along the section line IVX—IVX of FIG. 13; and FIG. 15 is a sectional view taken along the section line VX—VX of FIG. 14.

While the invention has a variety of applications it is particularly suitable for use as a heat resisting, electrically insulating wall forming an MHD generator chamber and will be so described.

Figure 1:
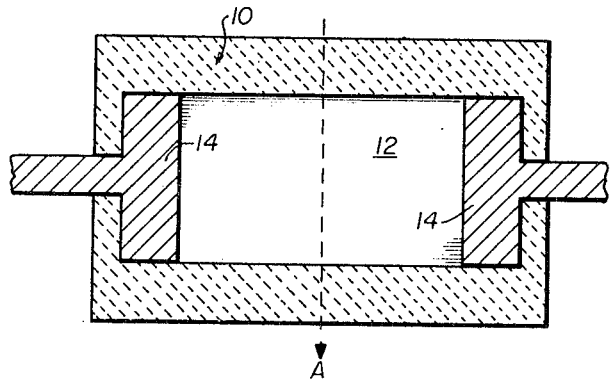
FIG. 1 is a sectional view useful in explaining the principles of an MHD generator.

Referring now to the drawings and FIG. 1 in particular, it is seen that an MHD generator apparatus diagrammatically illustrated herein comprises a wall 10 of any suitable heat resisting, electrically insulating material defining a generator chamber 12. The chamber 12 has a direct current magnetic field established in the direction of the dotted arrow A by a magnet assembly (not shown) disposed externally of the generator chamber and also a stream of hot working gas flowing therethrough substantially perpendicularly to the magnetic field. The working gas is generally heated to an elevated temperature in the order of from 2009 to 3000° K. and may contain an amount of any suitable alkaline metal such as potassium for the purpose of rendering the stream of hot gas electrically conductive through the utilization of its thermal ionization. A pair of electrodes 14, 14 are disposed in opposite relationship within the generator chamber 12 and have an electrical power generated across them through the cooperation of the stream of hot gas with the magnetic field in the wall in known manner.

Since the working gas flowing through the generator chamber has an elevated temperature and a high speed and contains a greatly corrosive element such as potassium, the insulating wall 10 defining the MHD generator chamber 12 is required to be highly resistive to heat, corrosion, wear, thermal shock, thermal stress, oxidation, etc. as well as being high in electrical insulation. In order to meet such requirements it has been commonly practiced to use an insulating wall of the construction as illustrated in FIG. 2 wherein like reference numerals designate the components corresponding to those shown in FIG. 1.

Figure 2:
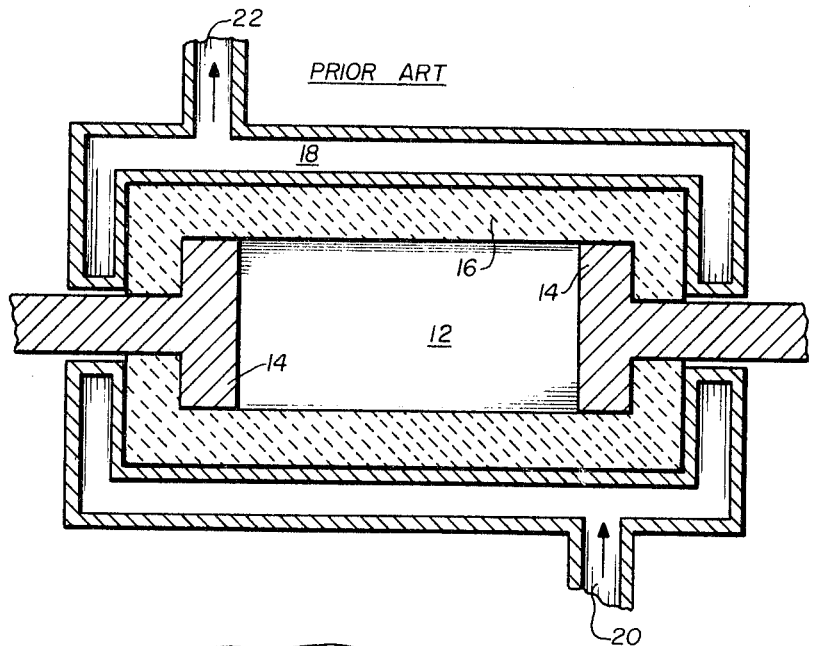
FIG. 2 is a schematic sectional view of a generator chamber of an MHD generator apparatus constructed in accordance with the prior art.

As shown in FIG. 2, a generator chamber 12 is confined by a composite structure including a layer 16 of any suitable heat resisting, electrically insulating material such as alumina or magnetic porcelain and a cooling jacket 18 disposed in intimate contact with the external surface of the layer 16. Any suitable fluid coolant such as water is adapted to flow from an inlet 20 into the jacket 18 and leave it through an outlet 22. In other words, a heat resisting, electrically insulating wall is composed of the insulating layer 16 and the cooling jacket 18 and used at a tolerable temperature for the wall or less by having the layer cooled by the jacket.

It is well known that in insulating walls such as illustrated in FIG. 2, the cooling jacket 18 is put in bad contact with the insulating layer 16 and that an increase in size of the layer 16 is liable to crack due to a difference between thermal expansions on the various portions thereof caused from a temperature gradient developed thereon in its thermal cycles. This leads to the difficulty with which the wall may be used for a long period of time. Particularly the formation of any void between the insulating layer and cooling jacket 16 and 18 respectively will cause the heat transfer from the layer 16 to the jacket 18 to become very low because of an extremely low thermal conductivity of air entering such voids.

The formation of such voids can be prevented to a certain extent by having any suitable refractory cement filling between the insulating layer and cooling jacket upon assembling the generator chamber. However a flow of hot working gas through the completed generator chamber inevitably results in a difference in thermal expansions developed across the width of the insulating layer to deform the latter. This deformation of the insulating wall necessarily results in the formation of voids between the layer and jacket. Therefore there is presently a tendency for MHD generators suitable for long service to include a water-cooled insulation wall called sometimes a "cold water" such as illustrated in FIG. 3.

Figure 3:
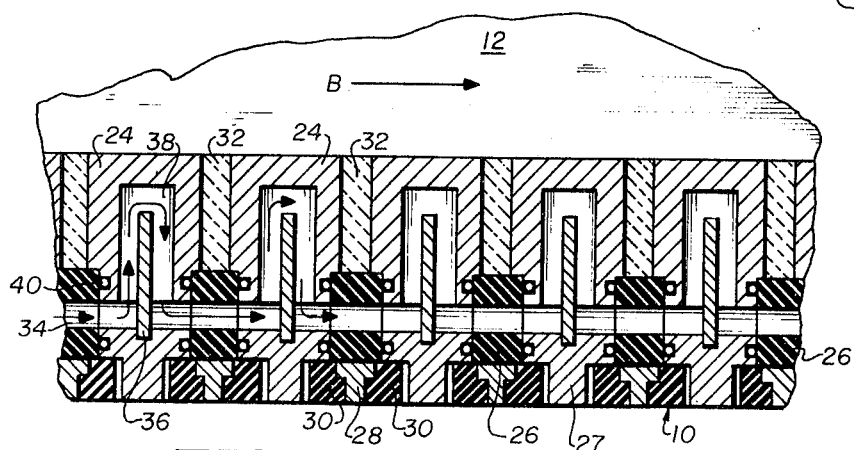
FIG. 3 is a fragmental sectional view of an insulation wall for a generator chamber of an MHD generator apparatus constructed in accordance with the prior art.

The conventional type of heat resisting, electrically insulating wall generally designated by the reference numeral 10 in FIG. 3 comprises a plurality of cooling members 24 in the form of a common hexagonal or circular cylinder made of any suitable metallic material having a high thermal conductivity and aligned with each other at substantially equal intervals and in electrically insulation relationship to form gaps therebetween. The cooling members 24 are rigidly secured to a plurality of aligned electrically insulating members 26 alternating metallic members 27 in such a manner that each pair of adjacent cooling members 24 are supported on the opposite sides to one insulating member 26. Then each insulating member 26 has that end remote from the associated cooling member and firmly connected to one metallic element 28 embedded in any electrically insulation 30 disposed in a recess on the exposed sides of a pair of adjacent metallic members 27. The components 27, 28 and 30 have the respective exposed surfaces flush with each other providing the external wall surface of the insulating wall 10.

As shown in FIG. 3, refractory material 32 such as alumina cement, fills the gaps between the cooling members 24 to form along with the cooling members 24 a smooth surface providing the internal wall surface. This wall surface defines a generator chamber 12 through which a hot working gas flows in the direction of the arrow B.

A cooling channel 34 extend through all the metallic and insulating members 27 and 26 respectively so as to contact those ends of the cooling members remote from the generator chamber and has a plurality of partitions 36 one for each cooling member. Each partition 36 interrupts the cooling channel 34 and projects into an opening formed in the associated cooling member 24 to form a cooling passageway 38 both ends of which communicate with the channel 34. In order to prevent any leakage of a fluid coolant involved through the connections of the insulating and metallic members 26, 24 and 27, a pair of O-rings 40 are disposed around each of insulating member 26 on both sides of the cooling channel 34.

With the arrangement illustrated it will be appreciated that a fluid coolant such as water flowing through the channel 34 abuts against the successive partitions 36 to deflect to the associated passages 38 thereby to cool the respective cooling members 24.

For such a wall, the initiation and termination of feed of a hot working gas to the generator chamber 12, variations in the state of the gas, changes in flow rate and temperature of a fluid coolant, etc. will cause thermal shocks and stresses in the materials for the components 24, 26 and 32 which, in turn, form cracks on the refractory material 32 and voids between the latter and the adjacent cooling member 24. This leads to a fear that the refractory material 32 may partly escape into the generator chamber 12.

The invention contemplates to eliminate the disadvantages just described by the provision of a heat resisting, electrically insulating wall improved in cooling effect, prevented from cracking due to thermal expansion and contraction in the thermal cycles and low in thermal loss as well as being simplified in construction.

Figure 4:
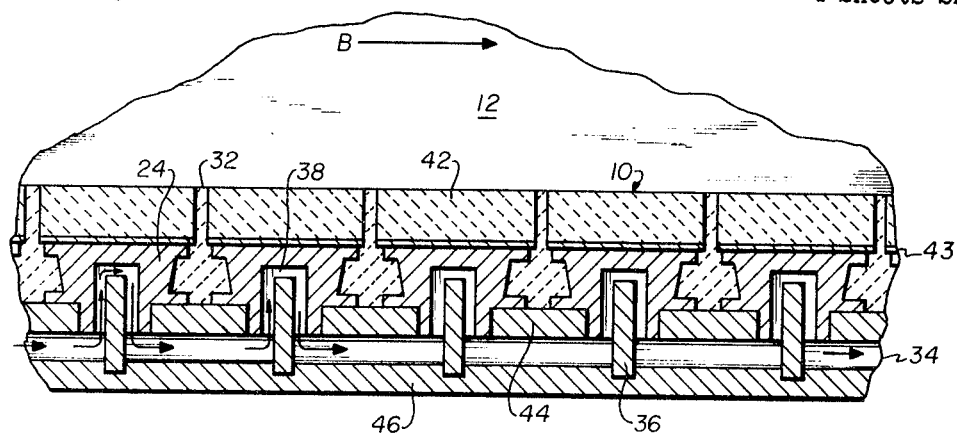
FIG. 4 is a fragmental sectional view of one form of a heat resisting electrically insulating wall constructed in accordance with the invention.

Referring now to FIG. 4 wherein like reference numerals designate the components corresponding or similar to those shown in FIG. 3, there is illustrated one embodiment of the invention. A heat resisting, electrically insulating wall 10 according to the invention comprises a plurality of insulating wall blocklets 42 in the form of a common hexagonal or circular cylinder or regular hexahedron made of any suitable heat resisting, electrically insulating material such as alumina, magnesia or beryllia porcelain and aligned with each other at substantially equal intervals to form narrow gaps therebetween.

According to the invention the insulating blocklets 42 each is provided on that end surface remote from a generating chamber 12 with a metallized layer 43 exaggerated in FIG. 4 only for purpose of illustration. The metallization of the inner ends of the insulating blocklets 42 may be accomplished by applying those end surfaces of the blocklets with a powder of molybdenum or manganese, firing the blocklets with the applied powder in an atmosphere of hydrogen at a temperature in the order of 1500° C. to form sintered metallic layers 43 rigidly connected to the body of the insulating blocklets through the respective intermediate reaction layers developed therebetween. Then each of the blocklets 42 is rigidly connected on the metallized surfaces 43 to one cooling metallic member 24 such as above described, as by brazing. The cooling member 24 is preferably composed of a metal having a coefficient of thermal expansion approximating that of the material for the blockets 42. Suitabale examples of the metal involve Kovar (trademark) alloy, nickel-chromium alloy, copper alloys, molybdenum, etc.

As in FIG. 4, each pair of adjacent cooling metallic member 24 are connected on the opposite sides to one protrusion 44 on a common metallic block 46 through which a cooling channel 34 extends. To this end, metallic members 24 may be brazed to the respective protrusions 44. Alternatively they may be secured to the protrusions by screws with O-rings (not shown) used to prevent any leakage of a fluid coolant involved through the connection of the members 24 and 44. A refractory material 32 such as alumina or magnesia cement fills the gaps formed between each pair of adjacent insulating blocklet and cooling member combinations 42–44. In other respects the arrangement is substantially identical to that illustrated in FIG. 3. It is, however, to be noted that the gaps between the cooling metallic members 24 are larger in transverse dimension than those between the blocklets 42 and have bilateral extensions respectively.

Since that portion of the insulating wall 10 exposed to a stream of hot working gas is composed of a multiplicity of the insulating blocklets 42 having the metallized integral layers 43 connected to the cooling metallic members 24 thereby to be effectively cooled with a flow of fluid coolant through the channel 34 and the passageways 38 disposed in the metallic support block 46 and in the metallic members 24 respectively the heat transfer at the interfaces between the insulating blocklets 42 and cooling members 24 can be improved to prevent the blocklets from cracking due to their thermal expansion and to decrease in thermal loss as well as the structure of the wall is possible to be relatively simplified. Even if that portion interposed between any pair of adjacent metallic members 24 of the refractory material 32 would be broken due to its thermal expansion and construction, the broken portion thereof will be effectively prevented from leaving the wall or scattering into the generator chamber.

The arrangement illustrated permits the insulating blocklets 42 exposed to the stream of hot working gas to be controlled in temperature by adjusting the width of the blocklets and/or a flow rate of a coolant involved.

Figure 5:
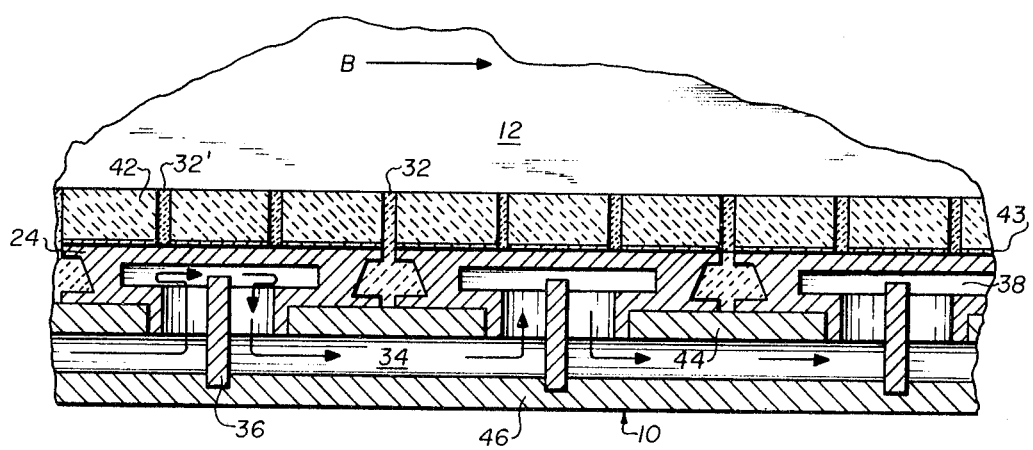

FIG. 5 shows a modification of the invention wherein each cooling metallic member 24 is operatively connected to a plurality of heat resisting, electrically insulating blocklets 42 alternating a refractory material 32' similar to the refractory material 32. In other respects, the arrangement is identical to that shown in FIG. 4.

Figure 6:
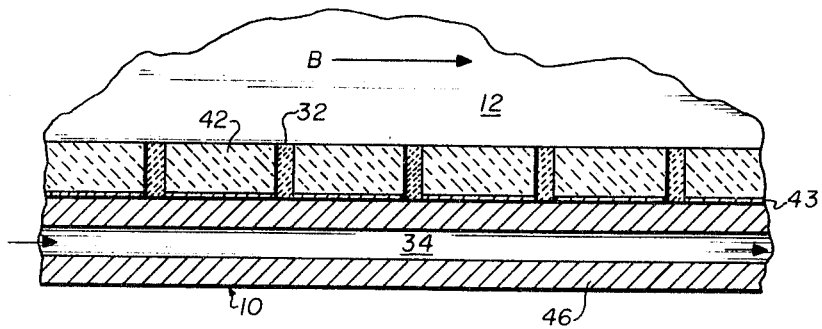

FIG. 6 illustrates a simpler form of the invention wherein a plurality of heat resisting, electrically insulating blocklets 42 alternate refractory layers 32 made of a similar material as used in the arrangement shown in FIGS. 4 and 5 and are directly connected to a combined supporting and cooling block 46 through the respective metallized end surfaces 43 of the blocklets. Then a cooling channel 34 extends through the block 46.

It will be understood that as the heat resisting, electrically insulating blocklets and refractory material shown in FIGS. 4 to 6 inclusive are capable of absorbing water, that potassium compounds and water vapor contained in a working gas will appreciably penetrate into them in operation leading to a fear that the electrically insulating property thereof is deteriorated and also the refractory material can be partly scattered into the associated generator chamber 12. The invention contemplates to avoid this fear by the provision of an arrangement illustrated in FIG. 7.

The arrangement illustrated in FIG. 7 comprises a heat resisting, electrically insulating coating 48 applied to the inner surfaces of insulating blocklets and refractory layers 42 and 32 respectively. The application of the coating 48 may be accomplished by depositing a powder of the same material as that for the blocklets and layers onto their inner exposed surfaces through the use of a device for generating a plasma jet (not shown). In operation the coating 48 serves to contact directly a working gas thereby to prevent potassium compounds and water vapor contained in the gas from penetrating into both the insulating blocklets and refractory layers.

It is also to be noted that a cooling metallic member shown in FIG. 7 is of U-shaped section and thin as compared with those shown in FIGS. 4 and 5. The cooling member 24 has the bottom of the U brazed to the metallized end surface 43 of each insulating blocklet 42 and both legs thereof rigidly connected at the ends to a supporting metallic member 25 to form a part of a cooling passageway 38. In other respects the arrangement is similar to that shown in FIGS. 4 or 5.

The cooling members 24 are generally different in coefficient of thermal expansion from the blockets 42 and will be strained due to this difference in coefficient of thermal expansion in the heat cycles. In order to permit the cooling metallic members 24 to be so strained, the same is made thin as possible in view of their mechanical strength. The material for the cooling member has preferably a coefficient of thermal expansion approximately close to that of the material for the heat resisting, electrically insulating blocklets 42. Suitable examples of such a material involves nickel alloys, molybdenum, copper and stainless steels.

Referring now to FIG. 8 wherein like reference numerals designate the components corresponding or similar to those shown in FIGS. 4 and 5, there is another modification of the invention improved in both mechanical strength and electrical insulation. An arrangement illustrated consists of a plurality of units of a common construction connected to a single supporting and cooling block 46 having extending therethrough a cooling channel 34. One of such units is illustrated in longitudinal and cross sections in FIGS. 9 and 10 respectively. Each unit comprises a heat resisting, electrically insulating blocklet 42 such as previously described, a cooling metallic member 24 in the form of thin sheet brazed on the metallized rear surface 43 of the blocklet 42 and a bored metallic mounting 50 hermetically brazed to the blocklets to form a narrow space therebetween. The mounting 50 has a pair of longitudinal bores 51 and 52 which communicate with the said space and a pair of lateral bores 53 and 54 communicate with the longitudinal bores 51 and 52 respectively to form a cooling passageway such as previously described. Then the mountings 50 are hermetically connected to a common cooling block 46 as by welding or brazing through which a cooling channel 34 extend so as to communicate with the respective lateral bores 53 and 54. As in the prior art practice a pair of O-rings 40 are disposed around each mounting 50 on both sides of the channel 34.

The blocklet 42 has its thickness determined by the thermal conductivity of the material composing the same, the operating condition of a working gas involved etc. and is preferably of approximately 10 mm. The cooling member 24 is preferably as thin as possible for the same reason as the embodiment in FIG. 7. If the cooling member 24 is made of molybdenum, its thickness is preferably of 0.5 mm. or less.

As shown in FIG. 8, any suitable refractory material 32 such as previously described fills gaps formed between each pair of adjacent insulating blockets 42 while an electrically insulating material 33 such as epoxide resin fills gaps formed between each pair of adjacent mountings 50. The results of experiments indicated that within the wall 10 points located at distances of 5 and 10 mm. from the surface thereof exposed to a hot working gas were at approximately 150° and 110° C. respectively. This proved that a synthetic resin such as epoxide resin relatively low in refractory property can be effectively used to fill the gaps between the mountings but at lower temperatures for the purpose of preventing the electrical insulation therebetween from deteriorating. If the any refractory material such as alumina or magnesia cement is also used the gaps between the mountings there is a fear that because of its water absorbing property the material may deteriorate in electrical resistance and scatter into the associated generator chamber during service as previously described. The use of such a synthetic resin effectively eliminates this fear.

Experiments were conducted with heat resisting, electrically insulating wall similar to the wall 10 illustrated in FIGS. 8 to 10 inclusive under the operating conditions provided by a device for producing plasma jets and far severer than those in the heat cycles of an MHD generator. More specifically a plasma jet was directed to the wall including a plurality of heat resisting, electrically insulating blocklets made of alumina porcelain into diameters of 30 mm. and thicknesses of 8 mm. The surface temperature of the wall reached a magnitude of from 1500° to 2000° C. with a thermal loss of from 150 to 180 watts/cm.² but the blocklets and the refractory layers were not cracked.

An arrangement shown in FIG. 11 wherein like reference numerals designate the components corresponding to those illustrated in FIG. 8 is substantially identical to that illustrated in FIGS. 8 to 10 inclusive except for each heat resisting electrically insulating blockets directly connected to a metallic mounting 50 respectively with a thin cooling member omitted. Thus the mountings serve as cooling members. Each of the blocklets 42 has its rear end surface remote from the associated generator chamber and entirely metallized and portions of the side walls adjacent the rear surface metallized. Then these metallized surfaces are brazed to a cooling block 46 thereby to directly cool the blocklets resulting in improvements in cooling effect.

FIG. 12 shows an arrangement similar to that illustrated in FIG. 8 to 10 inclusive and therefore the corresponding components in both arrangements are designated by the like reference numerals. The arrangement similarly includes a plurality of wall units of a common construction connected to a single cooling block. One of the wall units is shown in longitudinal section in FIG. 13 and in cross sections at different levels in FIGS. 14 and 15. Each of heat resisting, electrically insulating blocklets 42 such as previously described has that surface remote from the associated generator chamber (not shown) and metallized on which surface a cooling metallic member 24 in the form of a thin sheet is brazed. A metallic collar 56 connects both the blocklets 42 and the cooling member 24 to a ring-shaped electrically insulating member 58 having an outer fluted periphery to form a narrow space therebetween. To this end, the upper end portion of the insulating member 58 facing the collar 56 is metallized and brazed or welded to the collar. The insulating member 58 is connected to a common cooling block 46 through a metallic mounting 50 such as above described in conjunction with FIGS. 8 to 10 inclusive. To this end, the lower end portion of the insulating member 58 facing the mounting 50 is metallized and brazed or welded to the latter.

To form cooling passageway 38 for each blockets 42, the mounting 50 is bored in the same manner as previously described in conjunction with FIG. 9 and its longitudinal bores 51 and 52 communicate with the said space through the respective bores extending through the insulating member and aligned with the same. In other respects the arrangement is identical to that shown in FIGS. 8 to 10 inclusive.

It will be appreciated that the provision of the insulating member 58 improves the electrically insulating property of the wall.

While the invention has been illustrated and described in conjunction with various preferred embodiments thereof it is to be understood that numerous changes and modifications may be made without departing from the spirit and scope of the invention. For example, the cooling metallic members 24 may be connected to the cooling block 46 by screws or by welding process. This is true in the case of the connection of other metallic members. While the invention has been described in terms of generator chamber, it is to be understood that the same is equally applicable to combustion chambers, acceleration nozzles, diffusion tubes and other device using a hot gas.

What we claim is:

1. A heat resisting, electrically insulating wall comprising a plurality of heat resisting, electrically insulating blocklets disposed in substantially aligned relationship at substantially equal intervals to form narrow gaps therebetween, each of said blocklets having one surface exposed to a hot gas and the opposite surface metallized, one cooling metallic member brazed on said metallized surface of each of said blocklets, a refractory layer filling each of said gaps between said blocks, means including a fluid coolant to cool said metallic members.

2. A heat resisting, electrically insulating wall as claimed in claim 1, wherein said refractory layer is made of the same material as said heat resisting, electrically insulating blocklets and a powder of the same material as said blocklets is deposited on said one surface of each of said blockets and the surfaces of said refractory layers substantially flush with said one surface to form a continuous layer capable of being exposed to the hot gas.

3. A heat resisting, electrically insulating wall as claimed in claim 1, wherein a refractory material extends through said gaps betwen said blocklets up to a predetermined depth from the surface of the wall exposed to the hot gas, and a synthetic resin fills the remaining portion of each of said gaps.

4. A heat resisting, electrically insulating wall comprising a plurality of heat resisting, electrically insulating blocklets disposed in substantially aligned relationship at substantialy equal intervals to form narrow gaps therebetween, each of said blocklets having one surface exposed to a hot gap and the other surface metallized, one mounting brazed to said metallized surface of each of said blocklets and having a cooling passageway formed therein, a refractory material filling said gaps between said blocks up to a predetermined depth from the surface of the wall exposed to the hot gas, a synthetic resin filling the remaining portion of each of said gaps and a fluid coolant circulating through said passageways to directly cool said blocklets.

5. A heat resisting, electrically insulating wall comprising a plurality of heat resisting, electrically insulating blocklets disposed in substantially aligned relationship at substantially equal intervals to form narrow gaps therebetween, each of said blocklets having one surface exposed to a hot gas and the other surface metallized, one cooling metallic member brazed to said metallized surface of each of said blocklets, an electrically insulating ring-shaped member rigidly connected to each of said metallic member through the surface portion thereof contacting the associated metallic member being metallized, said insulating member having a cooling passageway formed therein, a refractory material filling each of said gaps between said blocklets up to a predetermined depth from the surface of the wall exposed to the hot gas, a synthetic resin filling the remaining portion of each of said gaps and a fluid coolant circulating through said passageways in said insulating member to cool said metallic members.

References Cited

UNITED STATES PATENTS 3,280,349  10/1966  Brenner, et al. _____ 310—11
3,432,715  3/1969   Yerouchalmi _____ 313—346

DAVID X. SLINEY, Primary Examiner